Patented July 14, 1931

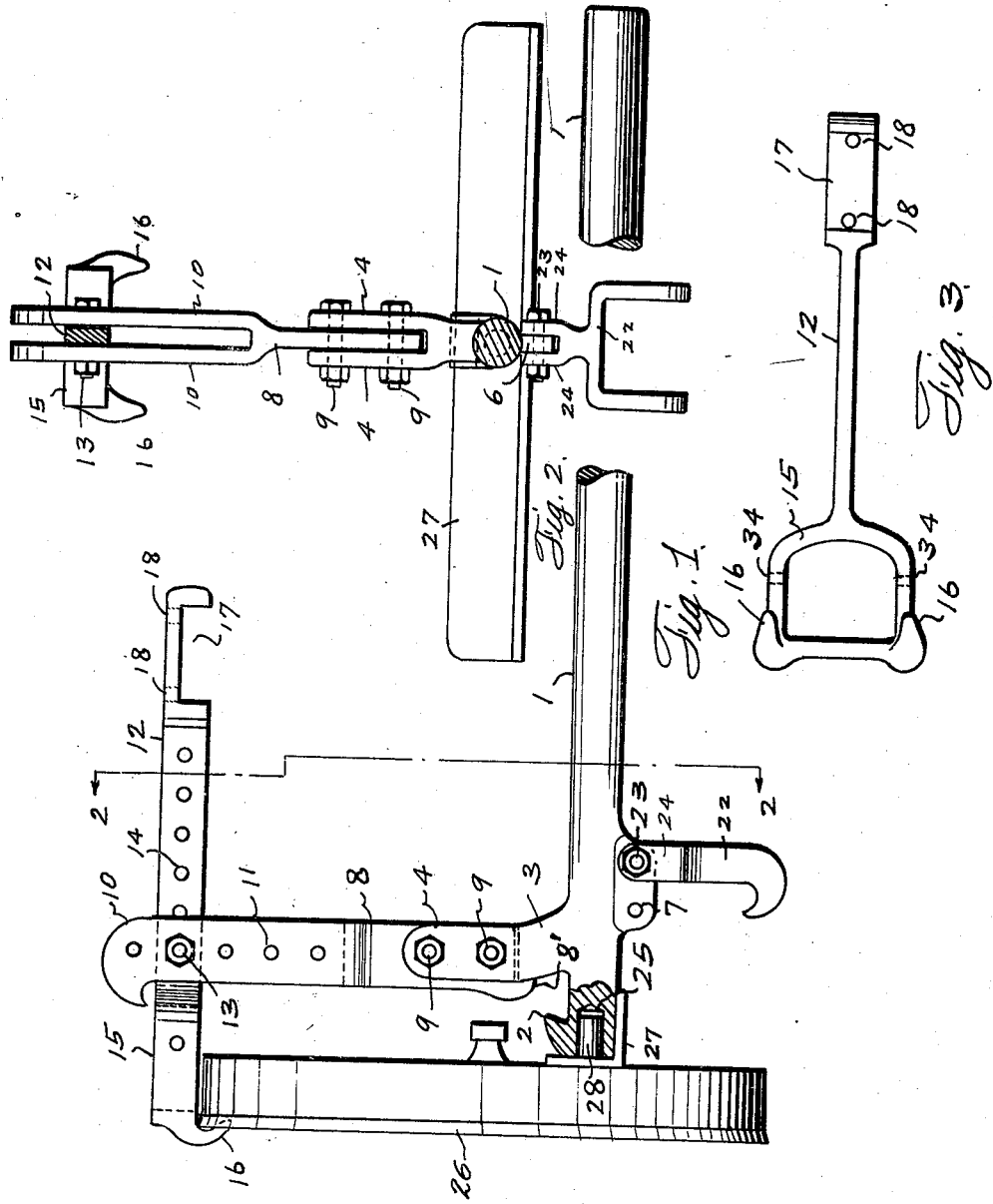

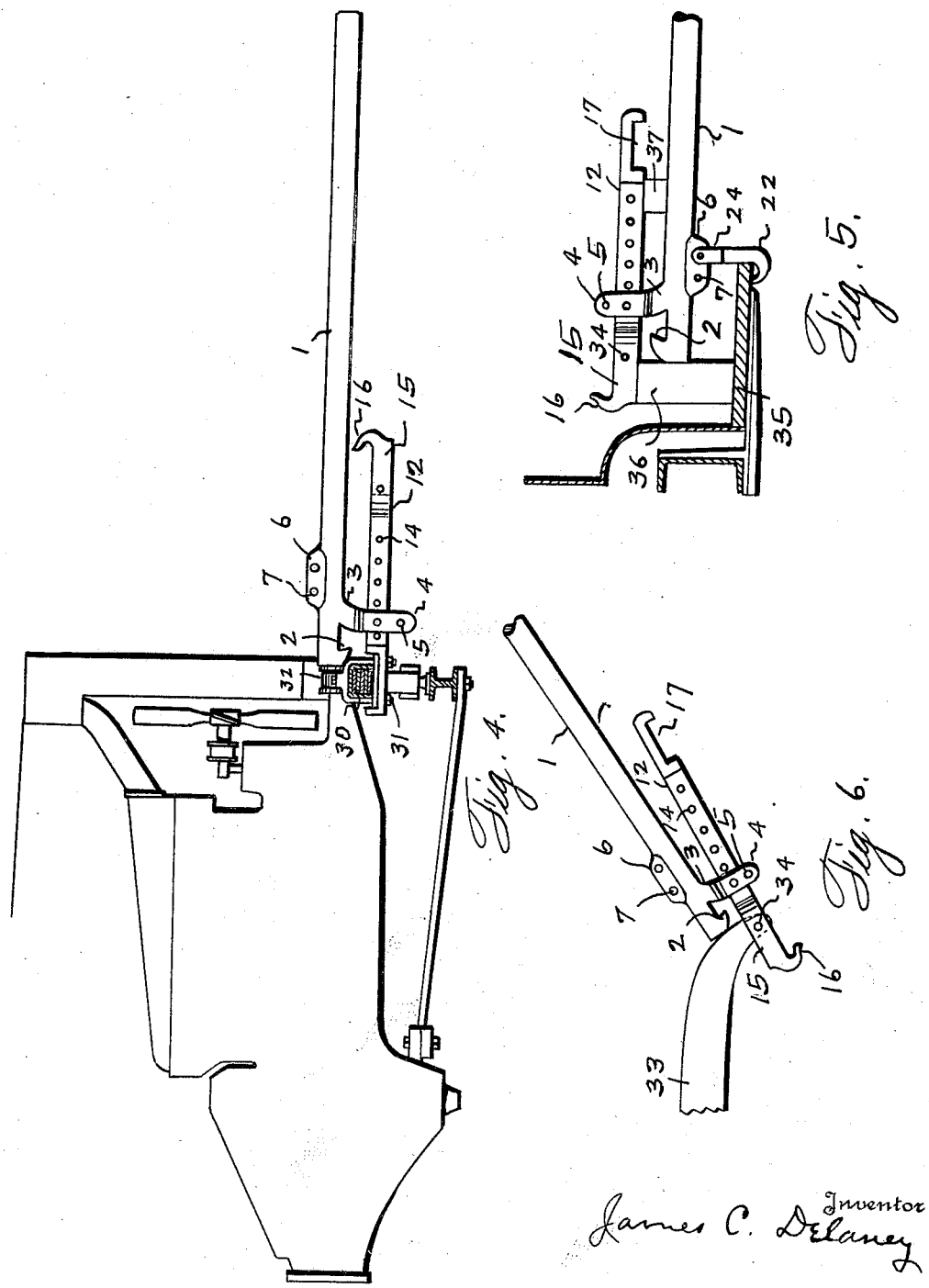

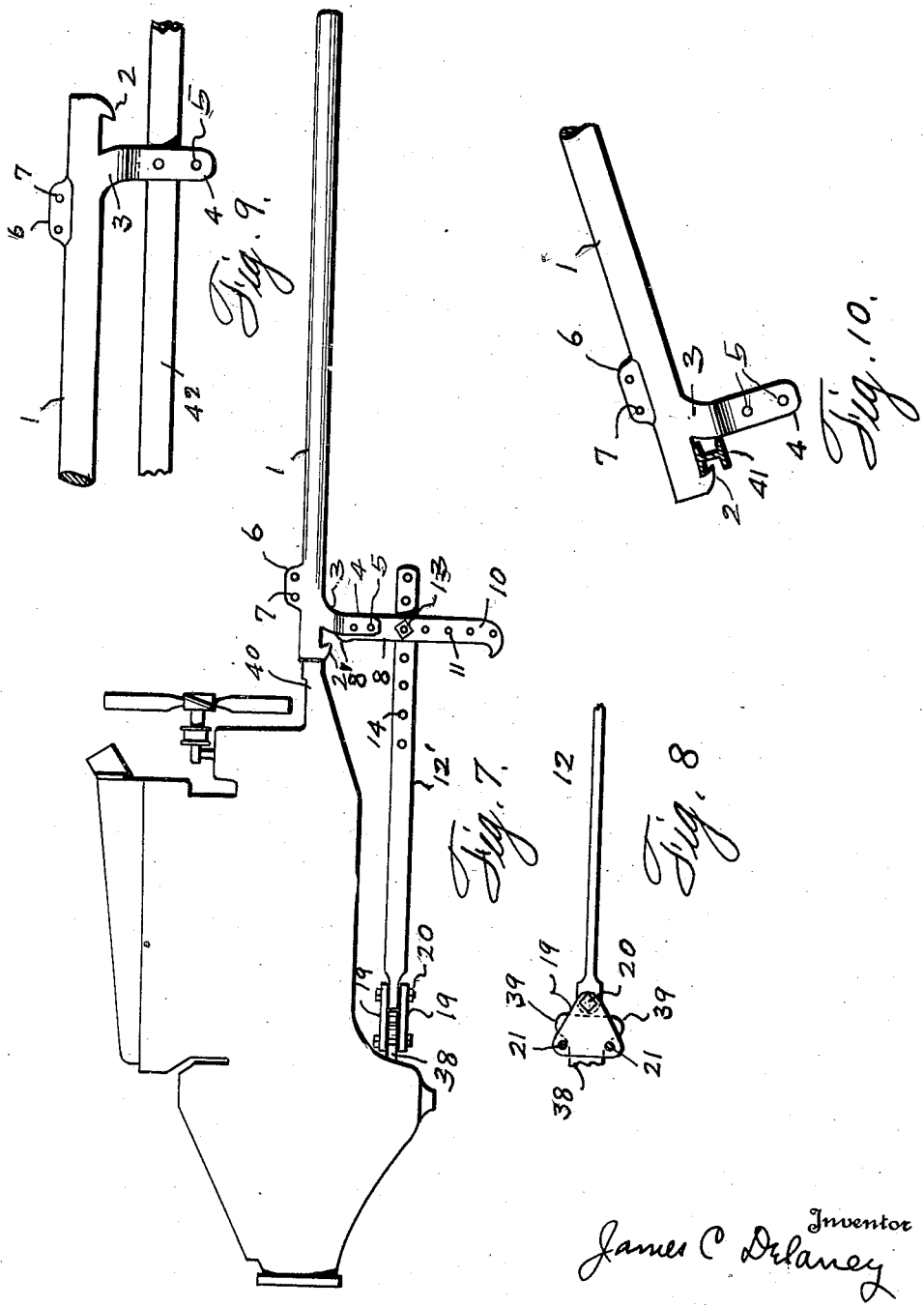

1,814,435

UNITED STATES PATENT OFFICE

JAMES C. DE LANEY, OF HOUSTON, TEXAS

HAND TOOL

Application filed June 17, 1927. Serial No. 199,492.

This invention relates to new and useful improvements in a hand tool.

One object of the invention is to provide a tool of the character described specially adapted for use in repairing motor vehicles, and more especially for straightening bent and distorted parts.

Another object of the invention is to provide an implement of the character described which is of such construction that it may be readily applied to any part of a motor vehicle likely to be bent or distorted, and which is of very simple construction, may be cheaply produced and is of such sturdy construction that it is not liable to get out of working order.

With the above and other objects in view this invention has particular relation to certain novel features of construction, operation and arrangement of parts an example of which is given in this specification and illustrated in the accompanying drawings, wherein:—

Figure 1 shows a side elevation of the implement, partly in section, applied to a vehicle wheel.

Figure 2 shows a sectional view thereof, taken on the line 2—2 of Figure 1.

Figure 3 shows a plan view of a tension bar employed.

Figure 4 shows a side elevation of the implement, as applied to the front end of a motor vehicle for straightening the distorted parts thereof.

Figure 5 shows a side view of the implement as applied to a vehicle running board for straightening the same.

Figure 6 shows a side view of the implement as applied in straightening a side member of the vehicle frame.

Figure 7 shows a side elevation of the implement as applied to the work of reforming and straightening a radius rod anchor.

Figure 8 shows a fragmentary plan view thereof.

Figure 9 shows a fragmentary side elevation of the implement as applied in straightening a vehicle bumper, and Figure 10 shows a fragmentary side elevation of the implement as applied in straightening a vehicle axle.

Referring now more particularly to the drawings, wherein like numerals of reference designate similar parts in each of the figures, the numeral 1 designates an operating handle which, at one end is formed with a hook 2 and spaced from this hook said handle has the lateral extension 3 which is bifurcated forming the fingers 4, 4, having the spaced transverse bearings 5 therethrough and opposite the extension 3 this handle is formed with an oblong lug 6 having spaced bearings, as 7 therethrough. The extension 3 may be, in effect elongated by the employment of a tubular tension arm 8, one end of which is adapted to be inserted between the fingers 4 and secured therein by means of the bolts 9, 9, which are passed therethrough and through the bearings 5 and the outer end of the tension arm 8 is bifurcated forming the fingers 10, 10, having aligned bearings as 11 therethrough. The numerals 12, 12' designate tension bars either of which may be employed and when used are inserted between the fingers 10 and secured therein by means of a bolt as 13, which passes through the bearings 11 of the fingers 10 as well as one of the bearings 14 of the tension bar. The tension bar 12 is formed, at one end with a stirrup 15 and with the spaced hooks 16 and at its other end has a lateral notch 17 with the bolt holes or bearings 18 therein. The tension bar above referred to may be used either with or without a tension arm 8 and in case said tension arm 8 is not employed the tension bar is inserted between the fingers 4 of the extension 3 and secured therein by a bolt as 9. The free end of the tension bar 12' has a yoke pivotally connected thereto consisting of the upper and lower plates 19, 19 preferably triangular in form and which are secured to the opposite sides of the tension bar 12' by means of the bolt 20 and which also have the bolts 21, 21 forming a part of said yoke and provided for the purpose to be hereinafter stated. There is a hook 22 pivotally connected to the lug 6 by means of the bolt 23 which passes through the fingers 24, 24, into which one end of said hook is formed, said bolt also passing through one of the bearings 7 of said lug 6.

The hooked end of the operating handle 1 has a socket 25 for the purpose to be hereinafter stated.

In application the implement may be assembled as shown in Figure 1, when it is desired to use the same for straightening a warped vehicle wheel as 26. For such use an elongated base bar 27, preferably formed of angle iron is placed against said wheel, said base bar having a stud 28 adapted to fit into the socket 25 of the handle 1. The hooks 16 are then engaged over the wheel rim and suitable pressure is applied through the handle 1 to pull the wheel into proper alignment. It is to be noted that the tension bar 8 has a depending shoulder 8' adapted to engage the extension 3 when force is applied to the handle 1 for the purpose above stated.

In application to the front part of the vehicle which has been bent or distorted the bar 12 may be secured between the fingers 4 of the extension 3 in reversed position to that shown in Figure 1 with the part to be straightened secured in the seat 17 by the U-shaped bolt 31 and when the implement is thus securely attached to the part to be straightened the operating handle will provide sufficient leverage for accomplishing the work. It often happens that side member 33 of the framework of a vehicle becomes bent or twisted and in such case arm 12 is secured between the fingers 4 of the extension 3 and a bolt is passed through the bearings 34, 34 of the stirrup 15 and through aligned bearings in the member to be straightened with the hooked end of the operating handle 1 abutting the side member 33 and the implement then manipulated through said operating lever 1 to straighten the distorted part.

For the purpose of straightening a distorted or bent running board as 35 the implement may be assembled, as shown in Figure 5 with the tension bar 12 secured between the fingers 4 with the hook 22 secured to the lug 6. A fulcrum block as 36 may then be disposed on the running board to form a fulcrum for one end of the bar 12 and a space block 37 between the other end of said bar and the handle 1 and said handle may then be manipulated to force the running board into proper place.

It sometimes happens that the radius rod anchor 38 gets bent or distorted and in such case the yoke, carried by the end of the bar 12' consisting of the yoke plates 19 may be inserted over the anchor with the bolts 21 engaged behind the lateral ears 39, 39, of said anchor and the hooked end of the operating handle 1 then disposed against the forwardly extended portion of the motor crank case and said handle may then be manipulated to straighten said anchor into its original position, as illustrated in Figures 7 and 8.

For straightening an axle 41 the hook 2 may be engaged over the side flange of the axle 41 with the projection 3 against the opposite flange and the handle 1 then manipulated to restore the distorted axles into its original position, as illustrated in Figure 10.

It sometimes happens that a vehicle bumper, as 42, will become bent and in such case the fingers 4 of the extension 3 may be fitted over the bent bumper and the handle 1 then manipulated in the desired direction to accomplish the desired result as illustrated in Figure 9.

What I claim is:

1. An implement of the character described including an operating handle, there being a lateral projection adjacent one end of said handle, a lug carried by the handle approximately opposite said projection, a tension bar, means for connecting said tension bar to said projection and a hook detachably secured to said lug.

2. An implement of the character described including an operating handle, there being a lateral projection integral with and adjacent one end of said handle, a lug carried by the handle approximately opposite said projection and forming means for the attachment of a hook to the handle, an adjustable tension bar disposed approximately parallel with the handle, means for connecting said tension bar to said projection, one end of the tension bar being bifurcated.

3. An implement of the character described including an operating handle having a lateral projection adjacent one end thereof, a single tension bar, rigid throughout, adjustably connected to said projection and disposed in substantially parallel relation with said handle.

4. An implement of the character described including an operating handle having a lateral projection adjacent one end thereof, a tension bar adjustably connected to said projection and disposed in substantially parallel relation with said handle, and a hook aranged opposite the tension bar and connected to said handle.

In testimony whereof I have signed my name to this specification.

JAMES C. DE LANEY.